O. PEARL.

Bobbins and Spindles for Spinning-Machines.

No. 6,036. Reissued Sept. 1, 1874.

Witnesses.
L. Aldrich
C. Frank Day

Inventor
Oliver Pearl
By his Attorney
E. Holler Lee

UNITED STATES PATENT OFFICE.

OLIVER PEARL, OF LAWRENCE, MASSACHUSETTS, ASSIGNOR OF ONE-HALF INTEREST TO JOSEPH P. BATTLES, OF SAME PLACE.

IMPROVEMENT IN BOBBINS AND SPINDLES FOR SPINNING-MACHINES.

Specification forming part of Letters Patent No. 102,587, dated May 3, 1870; reissue No. 6,036, dated September 1, 1874; application filed November 10, 1873.

*To all whom it may concern:*

Be it known that I, OLIVER PEARL, of Lawrence, in the county of Essex and State of Massachusetts, have made a certain new and useful invention having reference to Machinery for Spinning, of which the following is a specification:

My invention relates, first, to certain improvements in the construction of bobbins having frictional or adhesive bearings uniting them to the spindle and carried by it, the object of this part of my invention being to make a very light bobbin, and strengthen its various parts so that it will not be easily crushed or broken; second, to an improved construction and combination of both the bobbin and ring-spindle, so that they can be successfully used with greater advantages of length of traverse, speed, and steadiness of rotation than heretofore attained, and at the same time be much lighter, the object of this part of my invention being to greatly diminish the amount of power required to drive the spindle at any given speed, and increase its efficient operation at the same time.

Figure 1:
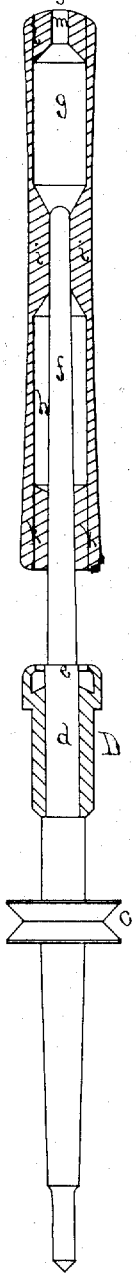
Figure 2:
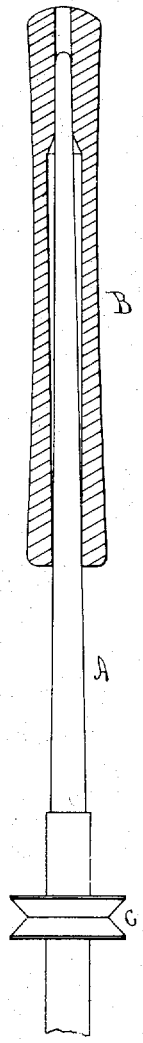

Figure 1 is a vertical section of a ring-spindle and bobbin made according to my invention. Fig. 2 is a vertical section of a ring-spindle and its bobbin in common use prior to my invention.

Heretofore it has been customary to construct bobbins, having adhesive bearings which secure them rigidly to the spindle with which they rotate, heavy and solid, as shown in Fig. 2, because, unlike bobbins which rotate upon their bearings upon and free from the spindles, they are subject to great strains in applying them to and removing them from the spindles, and, being rigid, when upon the latter are easily broken, especially by blows at or near the middle or upper end, unless so constructed.

In order to render these bobbins lighter it has been also customary to make them with a bore extending through them with an adhesive frictional bush or bearing at each or either end to support them upon the spindle. By an adhesive or frictional bush or bearing I mean one constructed to support the bobbin in a fixed position on the spindle, while it rotates and carries the bobbin with it, in contradistinction to a bush or bearing on which the bobbin revolves on the spindle freely. When constructed with the bore bushed only at the ends, as described, the bobbin, if made light and thin, is liable to become crushed or broken on account of want of strength in the middle. It has also been customary to construct ring-spindles, as shown in Fig. 2, extending substantially to the top of the bobbin, and of a certain length above the bolster, which supports them in the upper rail of the spinning-frame, in order to give sufficient length of traverse in spinning. Inasmuch as the spindle above the bolster D must be thick enough to prevent its springing, the requisite length and thickness of this part, commonly called the blade of the spindle, give it a certain weight, in proportion to its length, corresponding with the traverse; but, as, in order to properly balance the spindle, it was requisite that the weight of its blade above the bolster should be in proportion to a very much greater weight of the spindle and whirl below the bolster, to insure its steadiness of rotation, it is obvious that, with the blade extending to the top of the bobbin, as described, the weight of the entire spindle could not be successfully reduced below a certain standard.

In Fig. 1 the ring-spindle is shown of the ordinary cylindrical form, having attached to it the whirl C, and supported by the bolster D in the upper rail of the spinning-frame, and constructed to rest and revolve at its lower end in a step in the bottom rail of the frame. On the spindle, in the position in which it is intended to operate, is represented a bobbin of my improved construction. This bobbin is made with a thin and light shell or barrel of wood, and has a lower adhesive or frictional bearing, *k*, and a middle one, *i*, and is also bushed at the upper end by a plug, re-enforce, or bushing, *l*, and the bearings *k i* and bushing *l* are united to and combined with the shell of the bobbin, and strengthen it in all directions from being broken. The adhesive or frictional bearings *k i* are made to sustain the bobbin on the spindle in one position with relation to the latter, and so as to enable the spindle to carry the bobbin with it in its rotation.

In Fig. 2, A denotes an ordinary ring-spindle, and B a bobbin for it.

In Fig. 1 my improved ring-spindle, instead of extending substantially to the upper end of the bobbin, as heretofore, is only made long enough above the upper bolster D to enable the adhesive bearing *i* at the center of the bobbin to hold the latter firmly upon it, as shown. I am thus enabled to remove a large portion of the upper part of the blade of the spindle above the bolster D, and the tube of the bobbin projecting beyond the shortened blade of the spindle, resting, by its adhesive central bearing, upon the latter, and, being both light and rigid, retains its length and the position which it had before the spindle-blade was shortened, while the traverse of the spinning-frame and the length of the bobbin remain as before.

By thus dispensing with the length and weight at the top of the spindle above the bolster, while the length of bobbin and traverse of the frame remain as before, relatively, I am enabled to lighten the lower part of the spindle and whirl below the bolster D many times the weight taken from its blade above, without destroying the proper balance of the spindle and its consequent steadiness of rotation, and by these means I accomplish the ultimate effect, which is the purpose of this improvement, of enabling the spindle to be run steadily at high speed with much less power than heretofore, thus diminishing the expense and increasing the production at the same time.

In the bobbin, Fig. 1, the chambers *g h* intervene between the bearings *k i* and the bearing *i* and bushing *l* within the bobbin, and the bobbin is made of a light and thin cylinder supported at the middle and ends, and the cylinder can thus be made light and thin and cannot be readily broken either at the middle or ends; and the bushing *l* at the upper end of the bobbin, being at the point where the bobbin must be seized by the operator in withdrawing it from the spindle, performs an important function, in combination with the adhesive bearing *i*, in strengthening the bobbin at the points where the most strain is applied. As the bushing *l* is not required to be entirely solid to produce these results, it is itself made lighter by a central bore, *m*, as lightness at this point, so far above the bolster D, is important.

The central adhesive bearing *i*, besides supporting the bobbin on the spindle rigidly, as described, serves to strengthen the bobbin at the point on the solidity of which the projecting part of the bobbin (that performs the functions of the portion of the spindle-blade removed) depends for its efficiency. I therefore combine great lightness and strength in my bobbin.

What I claim as new, and my invention, is—

1. The described ring-spindle, having its blade from the bolster D upward shorter than the bobbin and combined with the bobbin, constructed substantially as described, by means of the adhesive bearings, as and for the purpose set forth.

2. The combination of the bobbin, the intermediate adhesive bearing *i*, and the blade of the spindle made shorter than the bobbin from the bolster D upward, substantially as described.

3. The described bobbin, provided with the central adhesive bearing *i*, the chambers *g h*, and the adhesive foot-bearing *k*, substantially as described.

4. The described bobbin, provided with the central adhesive bearing *i*, the two chambers *g h*, and the upper and lower end bushings or heads, substantially as described.

OLIVER PEARL.

Witnesses:

S. N. ALDRICH,

C. FRANK DAY.